United States Patent
Aarre

(10) Patent No.: US 10,386,513 B2
(45) Date of Patent: Aug. 20, 2019

(54) SEISMIC SURVEY ANALYSIS

(71) Applicant: SCHLUMBERGER TECHNOLOGY CORPORATION, Sugar Land, TX (US)

(72) Inventor: Victor Aarre, Stavanger (NO)

(73) Assignee: Schlumberger Technology Corporation, Sugar Land, TX (US)

(*) Notice: Subject to any disclaimer, the term of this patent is extended or adjusted under 35 U.S.C. 154(b) by 745 days.

(21) Appl. No.: 14/478,634

(22) Filed: Sep. 5, 2014

(65) Prior Publication Data

US 2015/0073715 A1  Mar. 12, 2015

Related U.S. Application Data

(60) Provisional application No. 61/874,492, filed on Sep. 6, 2013.

(51) Int. Cl.
| | | |
|---|---|---|
| *G06F 19/00* | (2011.01) | |
| *G01V 1/30* | (2006.01) | |
| *G01V 1/00* | (2006.01) | |
| *G01V 1/34* | (2006.01) | |

(52) U.S. Cl.
CPC ............. *G01V 1/306* (2013.01); *G01V 1/003* (2013.01); *G01V 1/30* (2013.01); *G01V 1/345* (2013.01); *G01V 2200/14* (2013.01); *G01V 2210/32* (2013.01); *G01V 2210/34* (2013.01); *G01V 2210/6161* (2013.01); *G01V 2210/62* (2013.01); *G01V 2210/63* (2013.01); *G01V 2210/632* (2013.01)

(58) Field of Classification Search
CPC ......... G06Q 30/08; G06Q 40/00; G06Q 40/04
USPC .............................. 702/14, 13, 182–185, 188
See application file for complete search history.

(56) References Cited

U.S. PATENT DOCUMENTS

| | | |
|---|---|---|
| 2007/0153627 A1 | 7/2007 | Tulett et al. |
| 2008/0205191 A1 | 8/2008 | Coste et al. |
| 2011/0118985 A1 | 5/2011 | Aarre |
| 2012/0173149 A1* | 7/2012 | Loseth ..................... G01V 1/30 702/11 |
| 2012/0261135 A1 | 10/2012 | Nowak et al. |
| 2014/0185413 A1 | 7/2014 | Aarre |
| 2015/0355353 A1* | 12/2015 | Whitaker ............... G01V 1/301 702/14 |

FOREIGN PATENT DOCUMENTS

WO  2013101518 A1  7/2013

OTHER PUBLICATIONS

Liu, et al., "Nonlinear structure-enhancing filtering using plane-wave prediction", Geophysical Prospecting, vol. 58, Issue 3, May 2010, pp. 415-427.

(Continued)

*Primary Examiner* — Edward Raymond

(57) ABSTRACT

A method can include receiving data sets where each of the data sets corresponds to one of a plurality of individual emitter-detector arrangements; calculating a multi-dimensional similarity metric for one of the data sets; and, based at least in part on the multi-dimensional similarity metric, assessing the one data set.

20 Claims, 15 Drawing Sheets

(56) References Cited

OTHER PUBLICATIONS

Tatanova, et al., "Time-Lapse AVO on Deepwater OBN Seismic at the Mars Field", SEG-2012-1259, Society of Exploration Geophysicists, SEG Annual Meeting, Las Vegas, Nevada, Nov. 4-9, 2012, pp. 1-5.
Extended Search Report issued in EP14183849.0 dated Mar. 4, 2015, 10 pages.
Extended Search Report for the equivalent European patent application 14183849.0 dated Mar. 4, 2015.

* cited by examiner

Trends 610

| Θ | Path Length | Frequency | Layer Thickness |
|---|---|---|---|
| 10° | 2*z*1.01 | | |
| 20° | 2*z*1.06 | | |
| 30° | 2*z*1.15 | | |
| 40° | 2*z*1.31 | | |
| 50° | 2*z*1.56 | | |
| 60° | 2*z*2.00 | | |

Fig. 6

Survey Angle $\Theta_1$
1102

Survey Angle $\Theta_2$
1104

Stack (composite)
1308

Stack w/Uncertainty
1310

Intersecting View
1410

SEISMIC SURVEY ANALYSIS

RELATED APPLICATIONS

This application claims the benefit of U.S. Provisional Patent Application Ser. No. 61/874,492 filed Sep. 6, 2013, which is incorporated herein by reference in its entirety.

BACKGROUND

Seismic interpretation is a process that may examine seismic data (e.g., location and time or depth) in an effort to identify subsurface structures such as horizons and faults. Structures may be, for example, faulted stratigraphic formations indicative of hydrocarbon traps or flow channels. In the field of resource extraction, enhancements to seismic interpretation can allow for construction of a more accurate model, which, in turn, may improve seismic volume analysis for purposes of resource extraction. Various techniques described herein pertain to processing of seismic data, for example, for analysis of such data to characterize one or more regions in a geologic environment and, for example, to perform one or more operations (e.g., field operations, etc.).

SUMMARY

A method can include receiving data sets where each of the data sets corresponds to one of a plurality of individual emitter-detector arrangements; calculating a multi-dimensional similarity metric for one of the data sets; and, based at least in part on the multi-dimensional similarity metric, assessing the one data set. A system can include a processor; memory operatively coupled to the processor; and one or more modules that include processor-executable instructions stored in the memory to instruct the system where the instructions include instructions to receive data sets where each of the data sets corresponds to one of a plurality of individual emitter-detector arrangements; calculate a multi-dimensional similarity metric for one of the data sets; and, based at least in part on the multi-dimensional similarity metric, assess the one data set. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 6 illustrates examples of trends with respect to survey angles;

DETAILED DESCRIPTION

Figure 1:
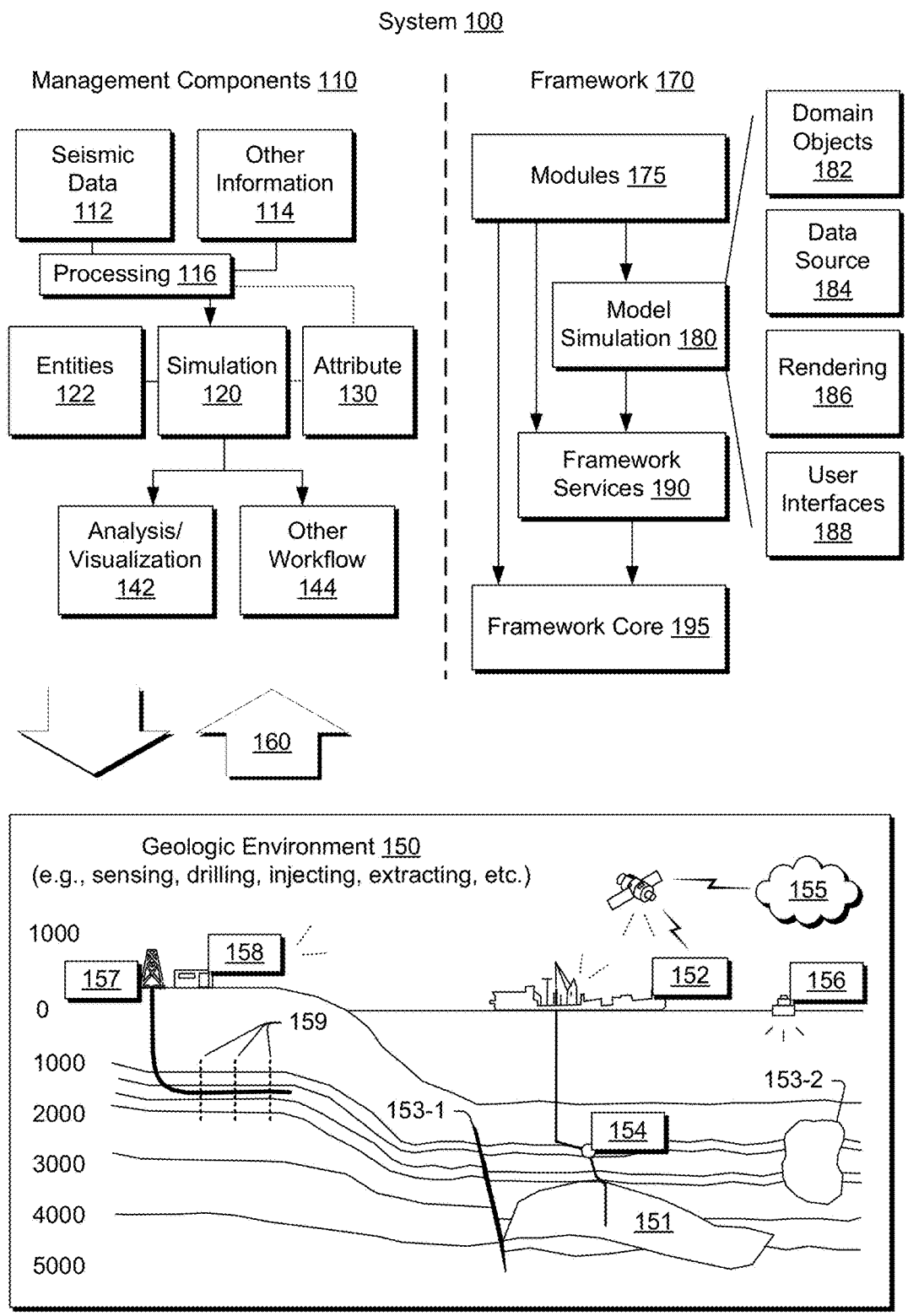
FIG. 1 illustrates an example system that includes various components for modeling a geologic environment and various equipment associated with the geologic environment.

This description is not to be taken in a limiting sense, but rather is made merely for the purpose of describing the general principles of the implementations. The scope of the described implementations should be ascertained with reference to the issued claims.

Seismic interpretation is a process that involves examining seismic data (e.g., with respect to location and time or depth) to identify one or more types of subsurface structures (e.g., horizons, faults, geobodies, etc.). When performing seismic interpretation, seismic data may be provided in the form of traces where, for example, each trace is an amplitude versus time recording of energy emitted by a source that has interacted with various subsurface structures. An interpretation process may involve visual display of seismic data and interaction using one or more tools (e.g., executable instruction modules stored in memory and executed by one or more processors). An interpretation process may consider vertical seismic sections, inline and crossline directions, horizontal seismic sections called horizontal time slices, etc. Seismic data may optionally be interpreted with other data such as, for example, well log data. As an example, a process may include performing an inversion to generate a model. For example, seismic data and optionally other data may be used in a method that includes solving an inverse problem to generate a model of a subsurface region. Such a model may be, for example, an acoustic impedance model and/or other type of model.

As an example, an interpretation process may include receiving seismic data from a data store (e.g., via a network or other connection). Seismic data may be formatted according to one of the SEG-Y format standards (Society of Exploration Geophysicists), the ZGY format standard (e.g., a bricked format) or another format. As an example, seismic data may be stored with trace header information, which may assist in analysis of the seismic data. Seismic data may optionally be accessed, for example, according to a number of traces (e.g., in an inline, crossline or inline and crossline directions), which may be entire traces or portions thereof (e.g., for one or more particular times or depths). As an example, given a number of traces across a region, a process may access some of those traces in a sub-region by specifying inline and crossline indexes (e.g., or geographic or grid coordinates) as well as a time or depth window.

A process may include determining one or more seismic attributes. A seismic attribute may be considered, for example, a way to describe, quantify, etc., characteristic content of seismic data. As an example, a quantified characteristic may be computed, measured, etc., from seismic data. A seismic attribute may be a rate of change of a quantity (or quantities) with respect to time, space or both time and space. As an example, a seismic attribute may provide for examination of seismic data in an amplitude domain, in a time domain, or in another manner. As an example, a seismic attribute may be based on another seismic attribute (e.g., a second derivative seismic attribute may be based on a first derivative seismic attribute, etc.).

A framework may include modules (e.g., processor-executable instructions stored in memory) to determine one or more seismic attributes. Seismic attributes may optionally be classified, for example, as volume attributes or surface attributes or one-dimensional attributes. As an example, a volume attribute may be an attribute computed from a seismic cube and may result in a new seismic cube that includes information pertaining to the volume attribute. As an example, a surface attribute may be a value associated with a surface of a seismic cube that includes information pertaining to a volume attribute.

A seismic interpretation may be performed using displayable information, for example, by rendering information to a display device, a projection device, a printing device, etc. As an example, one or more color schemes (e.g., optionally including black and white or greyscale) may be referenced for displayable information to enhance visual examination of the displayable information. A color scheme may include a palette, a range, etc. A look-up-table (LUT) or other data structure, function (e.g., linear or non-linear), etc., may allow for mapping of values associated with one or more seismic attributes to intensity, colors (e.g., RGB, YCbCr, etc.), etc. Where the human eye will be used or is used for viewing displayable information, a display scheme may be selected to enhance interpretation (e.g., to increase contrast, provide for blinking, etc.).

A module for determining one or more seismic attributes may include one or more parameters. As an example, a module may include one or more parameters that may be set via a graphical user interface (GUI), a specification file, etc. In such an example, an interpreter may wish to examine a seismic attribute for seismic data using one or more values of a parameter. As an example, such a module may provide a default value and a field, graphical control, etc., that allows for input of a value other than the default value.

As an example, seismic interpretation may be performed using seismic to simulation software such as the PETREL® seismic to simulation software framework (Schlumberger Limited, Houston, Tex.), which includes various features to perform attribute analyses (e.g., with respect to a 3D seismic cube, a 2D seismic line, etc.). While the PETREL® seismic to simulation software framework is mentioned, other types of software, frameworks, etc., may be employed for purposes of attribute analyses.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc., (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc., may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc., to develop a laterally extensive reservoir (e.g., via fracturing, injecting, extracting, etc.). As an example, the equipment 157 and/or 158 may include components, a system, systems, etc., for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc., of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
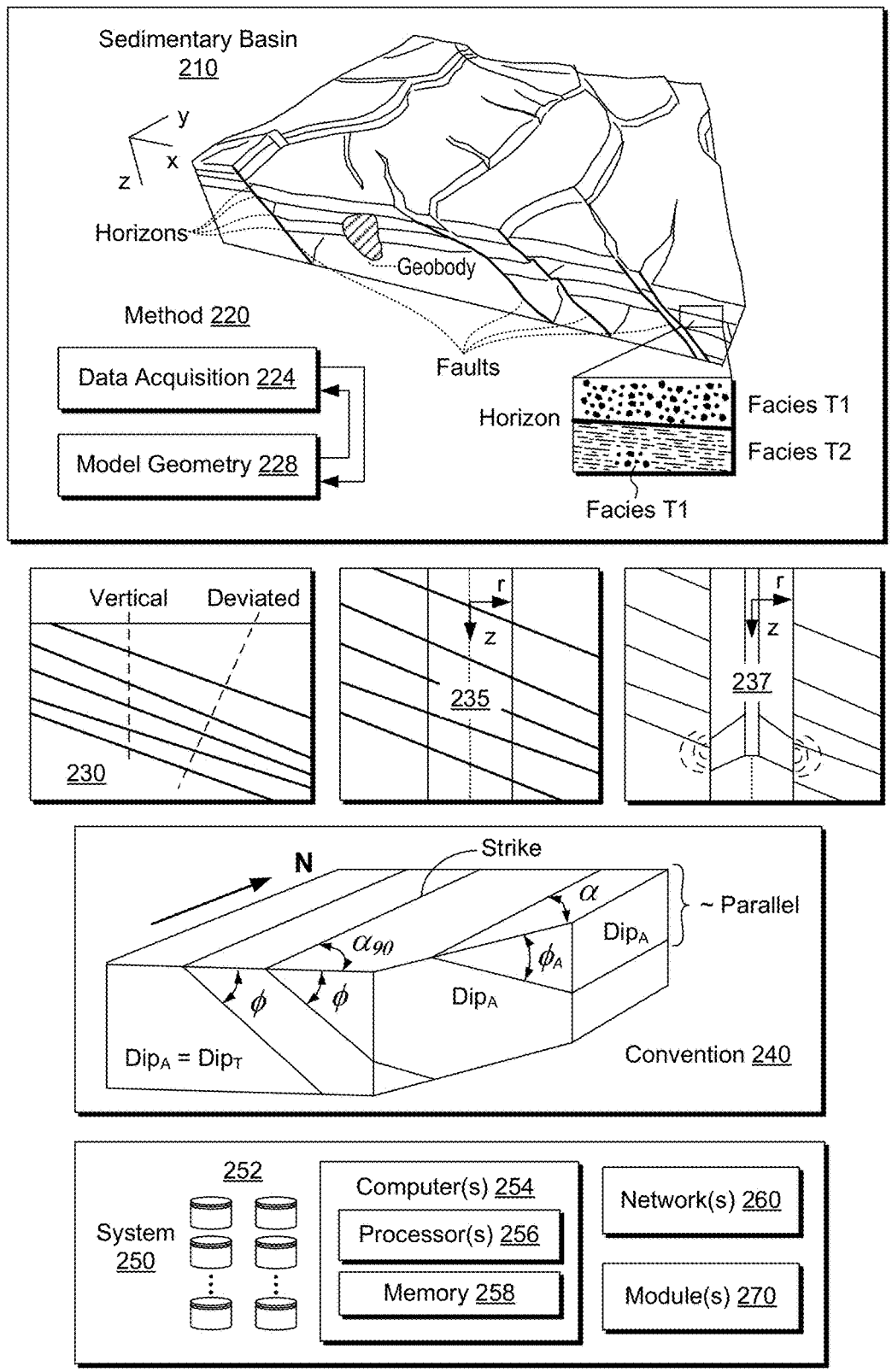
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc., may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to follow geological events (e.g., "iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the example formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may include vertical, deviated and/or horizontal portions. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A = Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with ϕ as $Dip_A = Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc., (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc., and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc., may be performed using one or more modules, which may be, for example, one or more of the one or more modules 270 of FIG. 2.

As mentioned, seismic data may be acquired and analyzed to better understand subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and/or S-waves, in a frequency range of approximately 1 Hz to approximately 100 Hz or optionally less that 1 Hz and/or optionally more than 100 Hz). Seismic data may be processed and interpreted, for example, to understand better composition, fluid content, extent and geometry of subsurface rocks.

Figure 3:
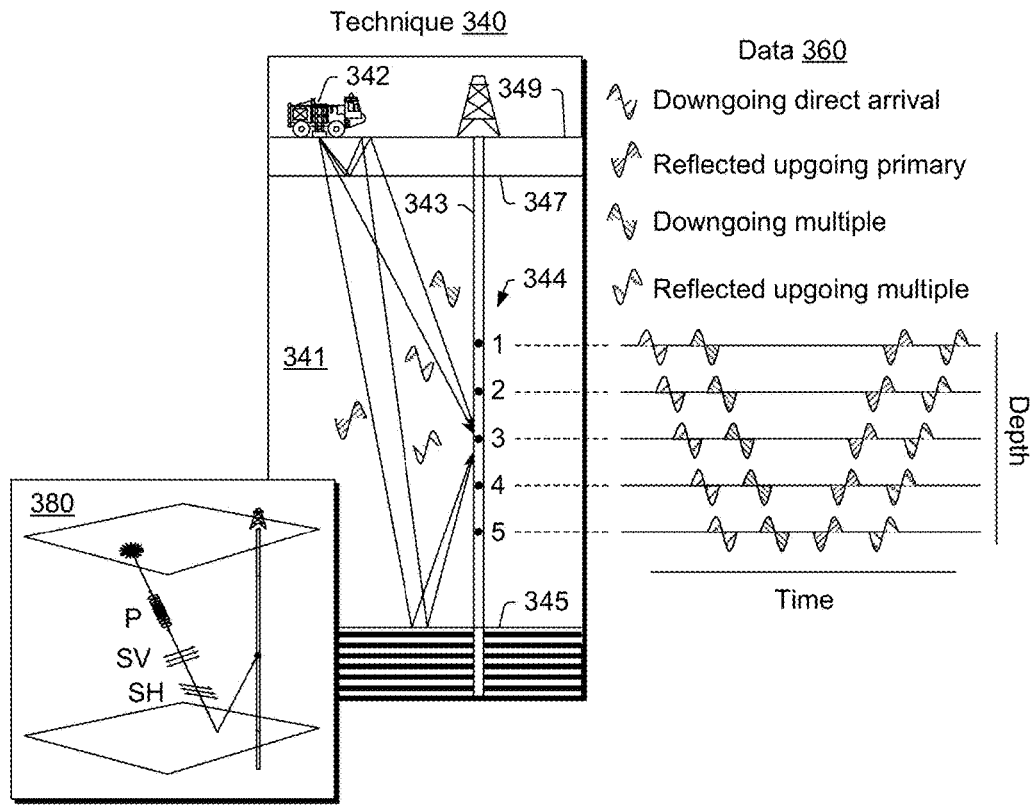
FIG. 3 illustrates an example of a technique that may acquire data.
Figure 3:
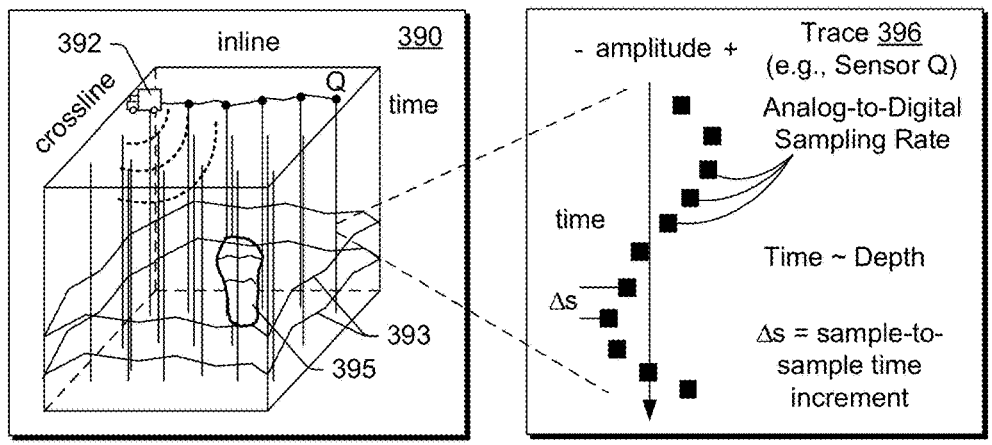

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specify one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc., in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\epsilon$, $\delta$ and $\gamma$. The Thomsen parameter $\delta$ describes depth mismatch between logs (e.g., actual depth) and seismic depth. As to the Thomsen parameter $\epsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\epsilon$ and $\gamma$ may be estimated from wave data while estimation of the Thomsen parameter $\delta$ may involve access to additional information. As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 4:
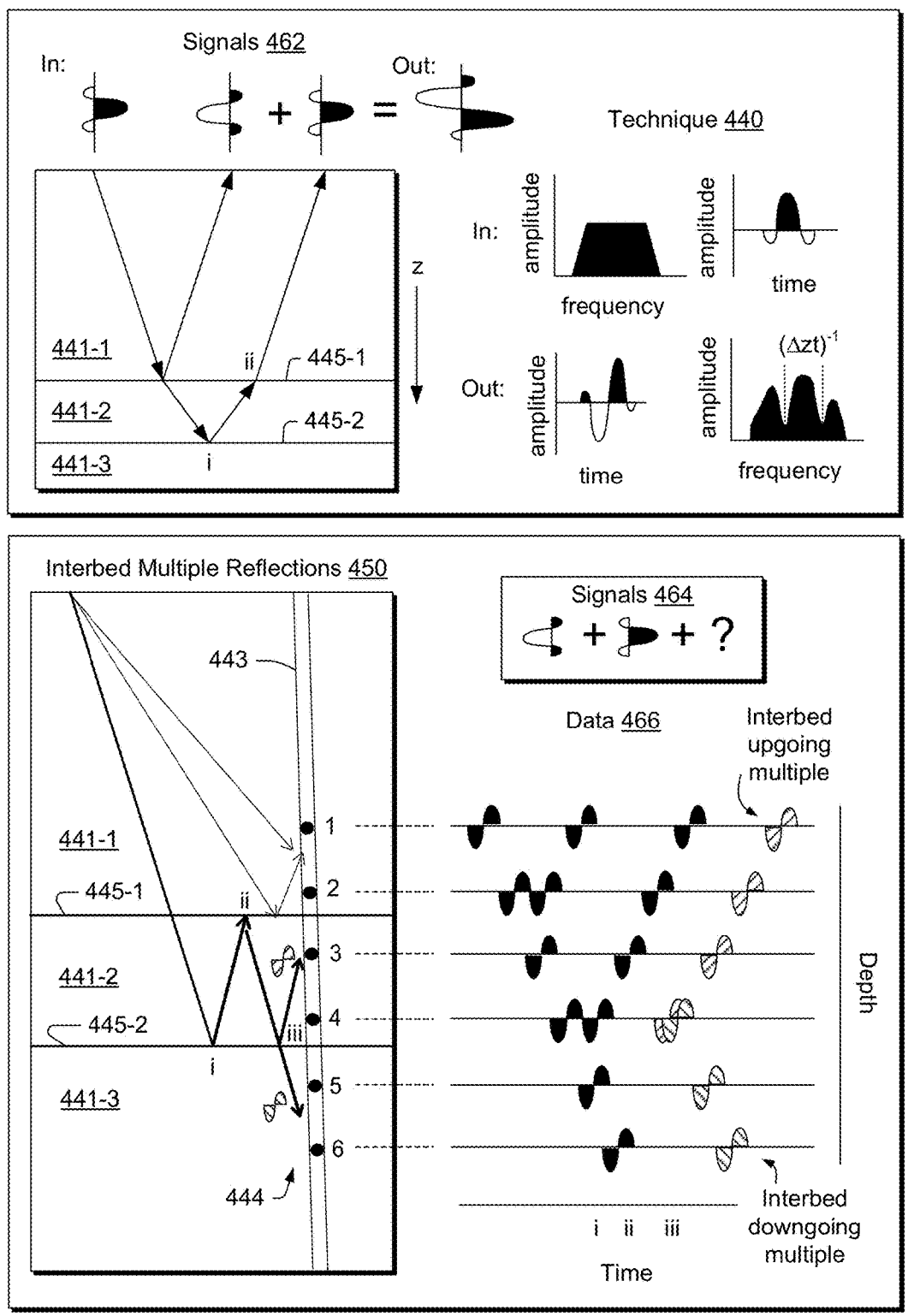
FIG. 4 illustrates examples of signals, an example of a technique, examples of data, etc.

FIG. 4 shows an example of a technique 440, examples of signals 462 associated with the technique 440, examples of interbed multiple reflections 450 and examples of signals 464 and data 466 associated with the interbed multiple reflections 450. As an example, the technique 440 may include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

As an example, a geologic environment may include layers 441-1, 441-2 and 441-3 where an interface 445-1 exists between the layers 441-1 and 441-2 and where an interface 445-2 exists between the layers 441-2 and 441-3. As illustrated in FIG. 4, a wavelet may be one of: (a) in part, first transmitted downward in the layer 441-1; in part, reflected upward by the interface 445-1 and transmitted upward in the layer 441-1; in part, transmitted through the interface 445-1 and transmitted downward in the layer 441-2; (d) in part, reflected upward by the interface 445-2 (see, e.g., "i") and transmitted upward in the layer 441-2; and (e) in part, transmitted through the interface 445-1 (see, e.g., "ii") and again transmitted in the layer 441-1. In such an example, signals (see, e.g., the signals 462) may be received as a result of wavelet reflection from the interface 445-1 and as a result of wavelet reflection from the interface 445-2. These signals may be shifted in time and in polarity such that addition of these signals results in a waveform that may be analyzed to derive some information as to one or more characteristics of the layer 441-2 (e.g., and/or one or more of the interfaces 445-1 and 445-2). For example, a Fourier transform of signals may provide information in a frequency domain that can be used to estimate a temporal thickness (e.g., $\Delta zt$) of the layer 441-2 (e.g., as related to acoustic impedance, reflectivity, etc.).

As to the data 466, as an example, they illustrate further transmissions of emitted energy, including transmissions associated with the interbed multiple reflections 450. For example, while the technique 440 is illustrated with respect to interface related events i and ii, the data 466 further account for additional interface related events, denoted iii, that stem from the event ii. Specifically, as shown in FIG. 4, energy is reflected downward by the interface 445-1 where a portion of that energy is transmitted through the interface 445-2 as an interbed downgoing multiple and where another portion of that energy is reflected upward by the interface 445-2 as an interbed upgoing multiple. These portions of energy may be received by one or more receivers 444 (e.g., disposed in a well 443) as signals. These signals may be summed with other signals, for example, as explained with respect to the technique 440. For example, such interbed multiple signals may be received by one or more receivers over a period of time in a manner that acts to "sum" their amplitudes with amplitudes of other signals (see, e.g., illustration of signals 462 where interbed multiple signals are represented by a question mark "?"). In such an example, the additional interbed signals may interfere with an analysis that aims to determine one or more characteristics of the layer 441-2 (e.g., and/or one or more of the interfaces 445-1 and 445-2). For example, interbed multiple signals may interfere with identification of a layer, an interface, interfaces, etc., (e.g., consider an analysis that determines temporal thickness of a layer, etc.).

Figure 5:
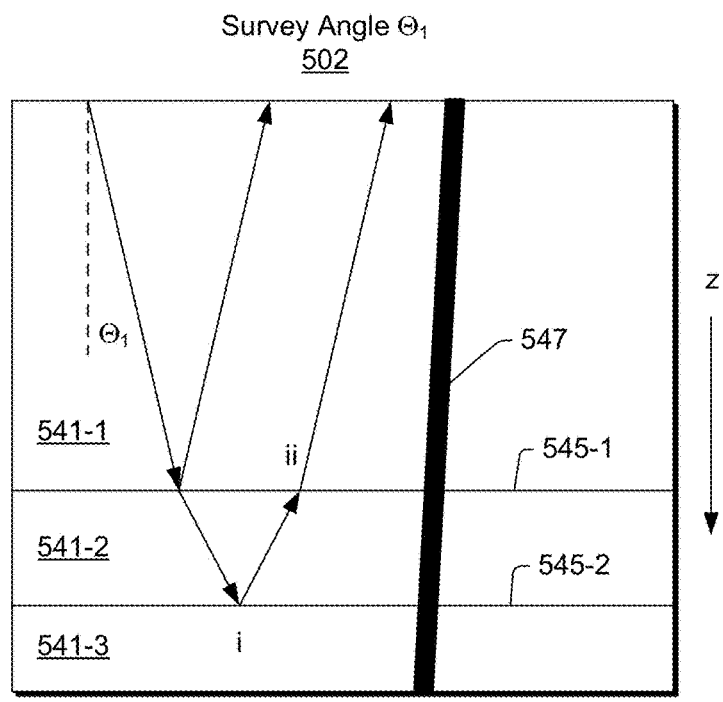
FIG. 5 illustrates examples of survey angles.
Figure 5:
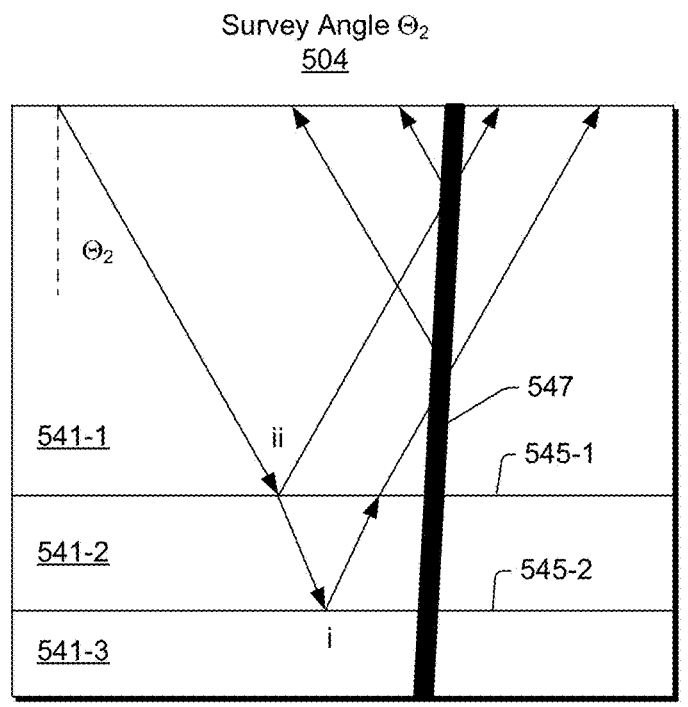

FIG. 5 shows examples 502 and 504 of survey angles $\Theta_1$ and $\Theta_2$ in a geologic environment that includes layers 541-1, 541-2 and 541-3 where an interface 545-1 exists between the layers 541-1 and 541-2, where an interface 545-2 exists between the layers 541-2 and 541-3 and where a relatively vertical feature 547 extends through the layers 541-1, 541-2 and 541-3.

As shown in the examples 502 and 504, the angle $\Theta_1$ is less than the angle $\Theta_2$. As angle increases, path length of a wave traveling in a subsurface region from an emitter to a detector increases, which can lead to attenuation of higher frequencies and increased interactions with features such as the feature 547. Thus, arrangements of emitters and detectors can, for a particular subsurface region, have an effect on acquired seismic survey data that covers that subsurface region.

FIG. 6 shows examples of trends 610 that may exist as angle increases. The trends 610 include a path length trend where path length increases with respect to angle, a frequency trend where higher frequencies are attenuated with respect to angle and where "resolution" with respect to layer thickness decreases with respect to angle (e.g., smaller angles may provide high resolution that can distinguish thinner layers).

As an example, seismic data may be processed to provide structural dip, for example, as a structural dip attribute. As an example, a survey may include acquiring data that may be represented with respect to a crossline dimension and an inline dimension. For example, a structural dip attribute may be calculated and stored as values for a surface, a volume, etc.

Figure 7:
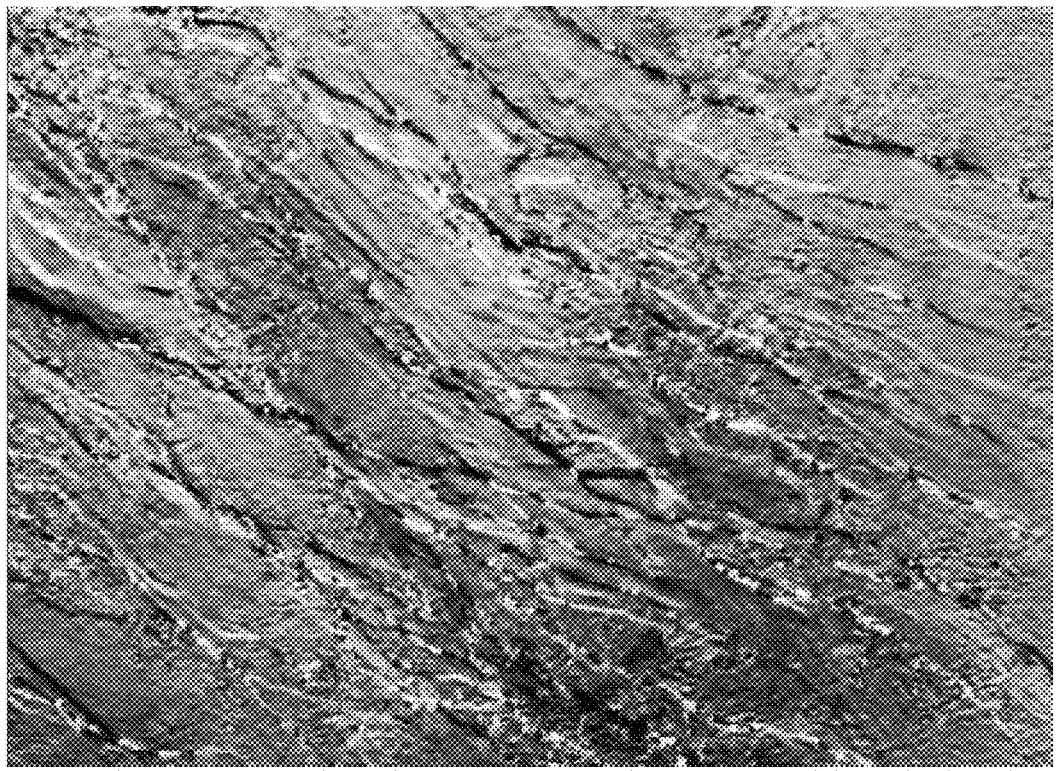
FIG. 7 illustrates an example of structural dip.

FIG. 7 shows an example plot 710 of a structural dip time-slice with respect to crossline and inline directions. As illustrated, structural dip can provide various geologic details, however, structural dip lacks amplitude/polarity information of seismic wavelets.

As an example, a method may be applied to seismic data to better understand how structural dip may vary with respect to offset and/or angle as may be associated with emitter-detector arrangements of a survey, for example, to estimate how suitable individual offset/angle gathers are for AVO imaging. A gather may be a collection of seismic traces that share an acquisition parameter, such as a common midpoint, with other collections of seismic traces. For example, consider an AVO survey that includes a plurality of emitter-detector arrangements (e.g., source-receiver pairs) with corresponding angles defined with respect to a common midpoint. Given a common midpoint, acquired survey data may be considered to cover a common subsurface region (e.g., a region that includes the midpoint).

Figure 8:
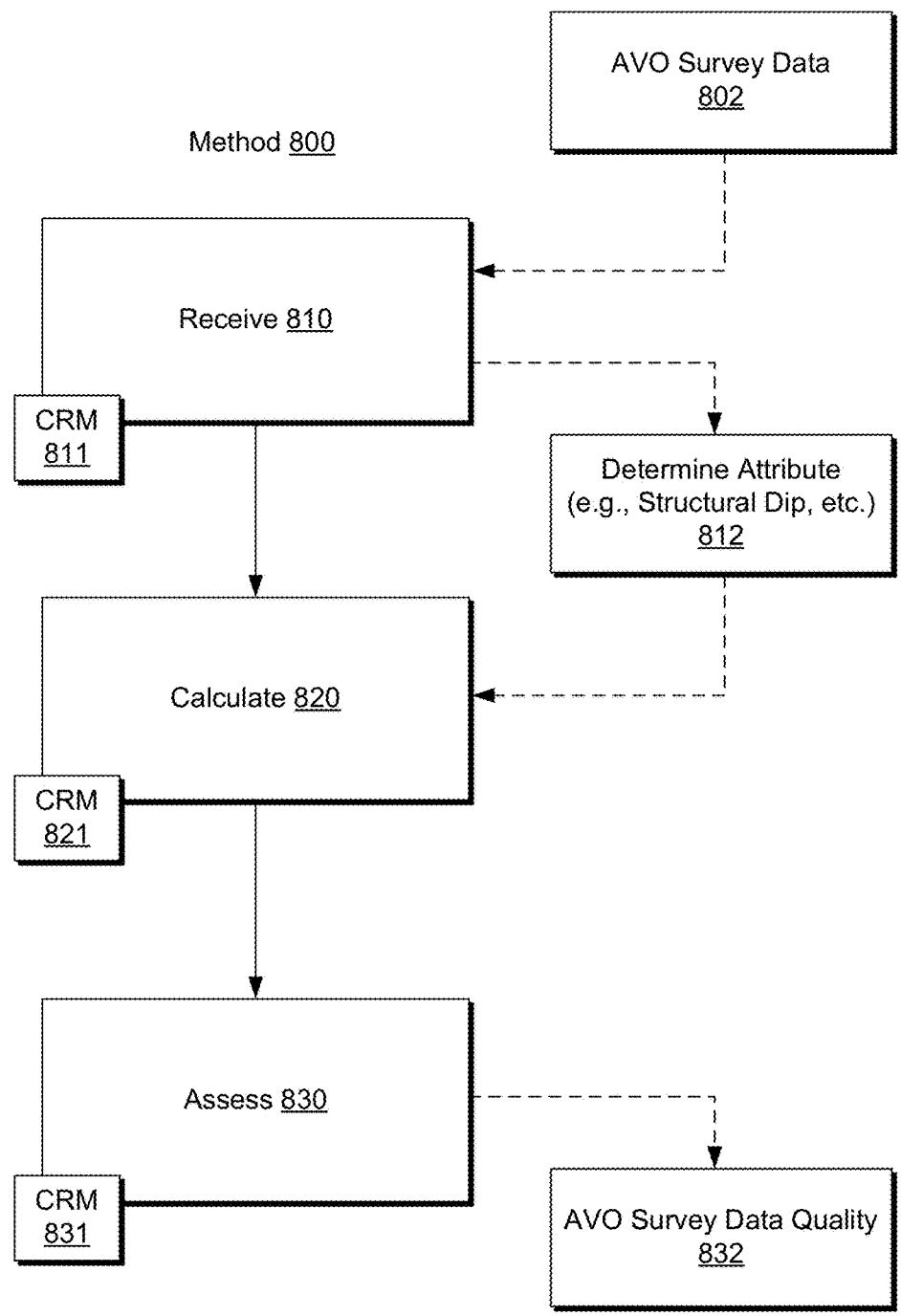
FIG. 8 illustrates an example of a method.

FIG. 8 shows an example of a method 800 that includes a reception block 810 for receiving data sets where each of the data sets corresponds to one of a plurality of individual emitter-detector arrangements, a calculation block 820 for calculating a multi-dimensional similarity metric for one of the data sets, and an assessment block 830 for assessing the one of the data sets. In such an example, the data sets may be or include seismic data sets of a geologic survey where each of the seismic data sets can correspond to one of a plurality of individual emitter-detector arrangements of the geologic survey. As an example, the data sets may be or include data sets of an ultrasound survey (e.g., of a body, of a product, of a structure, etc.).

As an example, a survey may include Illuminating a region, an object, etc., from multiple angles where a data set is acquired for each of the multiple angles. In such an example, illumination may be via one or more types of energy such as, for example, sound, photons, x-rays, etc.

As an example, the method 800 may include calculating individual similarity values for individual samples such that the similarity metric may be, for example, a composite of and/or based on individual similarity values. As an example, a multi-dimensional similarity metric may be a two-dimensional array of values, a three-dimensional array of values (e.g., a volume or cube), etc.

In the example of FIG. 8, the reception block 810 may include receiving AVO survey data per a data block 802 (e.g., AVO or AVA survey data). In the example of FIG. 8, the method 800 may include determining an attribute based at least in part on received data. For example, a determination block 812 can include determining an attribute such as, for example, a structural attribute. In such an example, the structural attribute may be determined with respect to multiple dimensions. In the example of FIG. 8, the assessment block 830 may include, per a data quality block 832, assessing quality of at least a portion of data of an AVO survey. As an example, such an assessment may pertain to an inversion technique.

The method 800 is shown in FIG. 8 in association with various computer-readable media (CRM) blocks 811, 821 and 831. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 800. As an example, a computer-readable medium (CRM) may be a computer-readable storage medium that is non-transitory and that is not a carrier wave.

As an example, an inversion technique may be a process by which data are used to generate a model that aims to be consistent with the data (e.g., solving an inverse problem). As an example, in seismology, one or more of surface seismic data, vertical seismic profiles and well log data may be used to perform an inversion where the result may be a model, for example, of Earth layers and their thickness, density and P- and S-wave velocities.

As an example, an inversion may begin with one or more seismic traces and output a model such as an acoustic impedance model. As an example, another type of technique, a forward modeling technique, may begin with an acoustic impedance model and a wavelet and output a seismic trace or traces. As an example, a workflow may include one or more techniques, which may be inversion and/or forward techniques.

Seismic inversion tends to benefit from high signal-to-noise ratio and large bandwidth. As an example, a method may include assessing data with respect to one or more factors such as, for example, signal-to-noise ratio, bandwidth (e.g., frequencies), etc. For example, the method 800 of FIG. 8 may include assessing data with respect to one or more factors.

As an example, a method can include applying a multi-dimensional operator. For example, consider a 2D operator or a 3D operator such that the method is a multi-dimensional technique. As an example, a multi-dimensional technique may include comparing layering/structure versus offset/angle. As an example, a method can include employing a 2D/3D operator for imaging/AVO quality control (e.g., AVO QC, AVA QC, etc.). As an example, a method may include estimating dip with a resolution that can add objectivity and that can improve amplitude insensitivity. Such an approach may be a multi-dimensional approach.

As an example, a method can include calculating volumetric (3D) structural dip in inline and crossline directions (e.g., or equivalent dip and azimuth fields) for individual offset and/or angle cubes and comparing the individual dip models against a reference and/or a consensus dip estimate. In such an example, a reference dip estimate may vary, depending on data quality. As an example, a reference dip estimate may be, for example, one of the following: (a) the structural dip calculated from a full-stack volume (e.g., a stack of individual offset/angle volumes); (b) an average of structural individual dip volumes; (c) structural dip calculated from a near-stack volume (e.g., a stack of individual offset/angle volumes); and (d) structural dip calculated from a band-limited full-stack.

As an example, a method can include, for individual points (e.g., samples) in a survey area, calculating a similarity measurement between individual offset/angle cubes (e.g., or planes) and using the result as a spatially and temporally variant indicator of imaging and AVO inversion quality (e.g., or AVA inversion quality, etc.).

As an example, a seismic survey may employ an amplitude versus offset (AVO) technique, which may also be described as an amplitude versus angle (AVA) technique. Such a technique can acquire seismic information that may be analyzed, for example, to investigate rock/layer properties (e.g., subsurface rock, layers, etc., in a geologic environment).

In geophysics and reflection seismology, such as AVO seismology, the Zoeppritz equations are a set of equations that can describe partitioning of seismic wave energy at an interface such as a boundary between two different layers of rock. Other formulations also exist for theoretical bases given by Zoeppritz, for example, consider the Aki-Richards 2- and 3-term approximations, and Connolly's Elastic Impedance (e.g., which estimates the acoustic impedance for given angles).

In an AVO technique, variation in seismic reflection amplitude with change in distance between shotpoint and receiver (e.g., emitter-detector, source-detector, etc.) can indicate differences in lithology and fluid content in rocks above and below the reflector. Through AVO analysis, factors such as, for example, thickness, porosity, density, velocity, lithology and fluid content of rocks may be estimated.

In an AVO analysis, as an example, given rock properties associated with known fluid content, a model may be developed that may be implemented to model other types of fluid content. For example, consider gas-filled sandstone as exhibiting increasing amplitude with offset and coal as exhibiting decreasing amplitude with offset.

As an example, an AVO technique may implement source-generated or mode-converted shear wave energy, which may allow for differentiation of degrees of gas saturation in rock. AVO analysis may be used for various types of rock where, for example, results may be more instructive for young, poorly consolidated rocks (e.g., consider the subsurface environment of the Gulf of Mexico) when compared to older, well-cemented sediments.

An AVO technique may apply an assumption that individual angle/offset seismic cubes correspond to a common "image" of a subsurface region and that variations between seismic traces for a given subsurface location correspond to amplitude and polarity of reflected signals. Satisfying such an assumption may, in practice, be impacted by various phenomena. For example, seismic signals may be compromised in part by multiples (e.g., reflections from other locations, overlapping the primary reflected signal for the analysis location), and some subsurface locations may be incompletely illuminated, which may lead to poor image quality. An AVO process may also depend on several preceding processes, like migration, NMO (e.g., normal moveout), spectral shaping, de-multiple, statics, etc., and whether such processes were competently applied.

As an example, one or more methods may be applied to quantify how suitable a processed pre-stack seismic dataset is for AVO/AVO analysis, for individual analysis points (samples) in the underground, and, for example, to improve an AVO process (e.g., based on output).

As an example, a method may include applying a "residual move-out estimation and correction" technique, for example, as part of a workflow. Such a technique can estimate how "flat" an image of a reflector is for individual analysis locations (e.g., for individual reflectors) in an offset/angle dimension. As an example, a workflow may include residual move-out estimation followed by another technique that applies a time-varying statics correction to individual traces to make one or more layers "flat".

As an example, a method can include estimating an offset/angle-dependent amplitude spectrum and applying a correction that aims to ensure that individual offsets/angles have a common vertical resolution, which may act to provide a common "level-of-detail" for individual 3D images of the underground and such that variability across an angle/offset domain may be of amplitude and polarity of a signal.

As an example, a workflow may include applying phase-estimation and phase-correction in a manner that acts to synchronize relative timing of individual frequencies for individual offsets/angles and for individual reflectors. Such a technique may be referred to as zero-phasing, which may be applied through correlation against well data, for example, where such data may be available for a survey area.

As an example, a workflow may include applying a de-multiple process to seismic data. In such an example, the de-multiple process may act as a dip-filter that may attenuate reflectors that are not pre-dominantly flat after NMO correction. For example, a de-multiple process may attenuate layers with a substantial residual move-out, potentially overlapping and interfering with other flat layers.

Various workflow processes associated with AVO may be one-dimensional in that they work on one bin at a time (e.g., for binned seismic data). For example, a one-dimensional technique may revolve around residual move-out, amplitude spectrum versus offset/angle, AVO residual (versus 2- or 3-term AVO-modeled response), etc.

As mentioned, an assumption may be made for AVO such as, for example, individual angle/offset seismic cubes include a common image of a subsurface region of a geologic environment and that variation between seismic traces for a given subsurface location is for amplitude and polarity of a reflected signal.

As an example, a method can include, for individual points (e.g., samples) in a survey area, calculating a similarity measurement between individual offset/angle cubes (e.g., or planes) and using the result as a spatially and temporally variant indicator of imaging and AVO inversion quality. In such an example, an indicator may be sensitive to the similarity of a 3D image's shape and/or structure and relatively insensitive to the amplitude and polarity of the individual reflectors. For example, an indicator may be sensitive to the similarity of local phase content, in three dimensions (e.g., or two dimensions), across a plurality of individual offset/angle volumes (e.g., or planes).

As mentioned, a method can include calculating volumetric (3D) structural dip in inline and crossline directions (e.g., or equivalent dip and azimuth fields) for individual offset/angle cubes and comparing the individual dip models against a reference/consensus dip estimate.

As an example, structural dip may be calculated from a full-stack volume (e.g., a stack of individual offset/angle volumes). As an example, structural dip may be calculated as an average of structural individual dip volumes. As an example, structural dip may be calculated from a near-stack volume (e.g., a stack of individual offset/angle volumes). As an example, structural dip may be calculated from a band-limited full-stack.

As an example, a method can include receiving data sets for a plurality of corresponding individual offsets/angles, calculating inline and crossline structural dip for at least a portion of the individual offsets/angles (e.g., at least two), and calculating a reference/consensus dip model.

In approaches where the surface normal is constructed by averaging of the positive dip (e.g., from current trace to the next trace) and the negative dip (e.g., from current trace to the previous trace), in inline and crossline directions, such a format has half the resolution of a positive/negative dip representation. An approach for volumetric dip that offers a full theoretical resolution is described in U.S. patent application Ser. No. 12/891,859, entitled "Consistent Dip Estimation for Seismic Imaging" (Pub. No. US 2011/0118985 of May 19, 2011, which is incorporated by reference herein).

Dip estimation techniques that assume that a subsurface volume conforms to a "layer-cake" model (i.e., that the subsurface is just a stack of laterally infinitely continuous surfaces, possibly with close-to zero thickness at some locations) can fail to account for subsurface objects (e.g., channels, salt bodies, etc.) that can have finite lateral extents (e.g., structural discontinuities can outline boundaries of such objects). In such situations, where a discontinuity may exist, the concept of a discontinuity dip attribute is lacking as dip is defined as a spatial derivative of a structure and the derivative is per definition undefined at discontinuities. For example, for a reflector, positive dip and negative dip for a location with respect to a trace may not be equal such that a reflector normal vector for a peak at that location may be pointing vertically, indicating a zero dip at that location, which may be inaccurate.

The approach described in the aforementioned application (Pub. No. US 2011/0118985 A1) can decouple dip through definition of a positive dip and a negative dip. Thus, for example, at a given point in a volume, the positive dip (e.g., to the right) and the negative dip (e.g., to the left) may not necessarily have uniform slope across the given point. Such an approach can alleviate first derivative concerns, especially where a boundary may exist within a subsurface volume (e.g., channel, fault, body, etc.).

As an example, for a volumetric dip model, such as the model described in Pub. No. US 2011/0118985 A1, the following information may be provided for points (e.g., $p(i,j,k)$) in a subsurface volume: (i) positive inline dip; (ii) negative inline dip; (iii) positive crossline dip; (iv) negative crossline dip; and (v) dip uncertainty. With respect to data structure or data storage demands, such an approach can be represented, for example, using five volumes (e.g., of similar size as an input seismic data volume) that represent the subsurface environment (e.g., as imaged by seismic data). As an example, a unit for dip can be defined as millisecond per trace, or meter per trace, or another isomorphic unit of choice (e.g., angle). In such an example, a lateral coordinate system may be indexed by inline and crossline numbers; noting that another coordinate system could be used (e.g., based on row/column numbers, geographical position in x/y coordinates, etc.).

Figure 9:
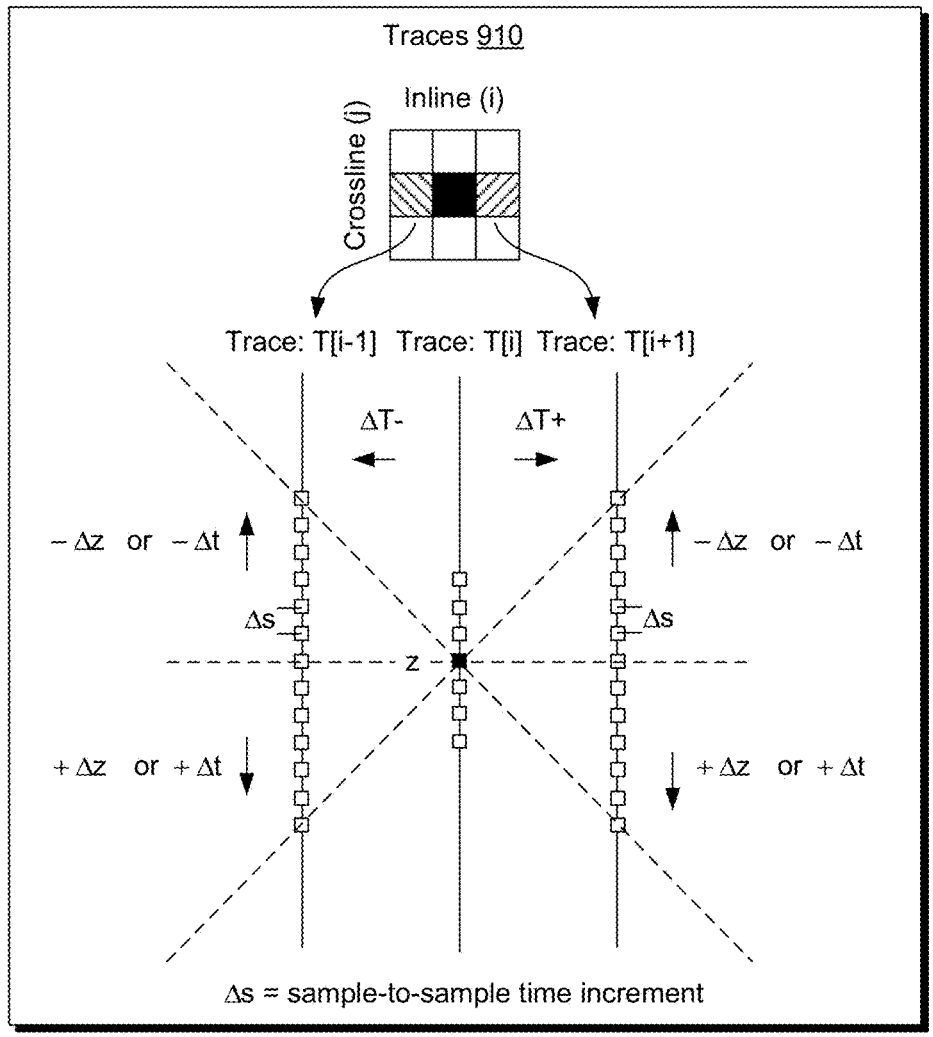
FIG. 9 illustrates an example of a technique.

FIG. 9 shows an example of a technique to determine dip values from seismic data (see also, e.g., Pub. No. US 2011/0118985 A1). In particular, FIG. 9 shows a series of traces 910 and a method 930 that implements a Taylor series expansion. The series of traces 910 includes various parameters, for example, for trace position in a 2D inline and crossline coordinate system and for sample location with respect to time or depth. Also shown is a sample-to-sample time increment $\Delta s$, which may be, for example, converted to a sample-to-sample depth increment.

As to the method 930, a trace T[i] and a trace T[i−1] are considered as being related by equation 934. By applying a Taylor series expansion, the equation can be represented as equation 938. By rearranging the equation 938, the equation 942 is provided, which can be solved for $\Delta z(z)$, which represents a time or depth displacement for "z" between trace T[i] and trace T[i−1], which may be stored as a negative dip value for the trace T[i] and a location defined by the sample "z". As an example, a feature exists at "z" in the trace T[i] and evidence of that feature exists in the trace T[i−1] at a location displaced by a distance or time from that of the trace T[i], where the displacement is represented by $\Delta z$. As that displacement is with respect to a prior trace with respect to the inline coordinate, for trace T[i], that displacement is a negative dip for the trace T[i]. Equations may be applied for a positive dip for the trace T[i], for example, with respect to the trace T[i−1]. Further, equations may applied for both negative dip and positive dip with respect to the crossline coordinate (e.g., T[j], T[j−1], and T[j+1]). In such a manner, values for four of the five volumes may be determined. As to the uncertainty data volume, as an example, it may include quality control data, consistency data, inconsistency data or other data that indicates uncertainty as to one or more dip values (e.g., at a location or locations in a subsurface volume).

As indicated in the example of FIG. 9, a method may implement a Taylor series expansion technique for calculating time/depth-varying timing difference (e.g., structural dip) between traces in positive and negative directions. As an example, a method may implement a technique other than a Taylor series expansion for calculating time/depth-varying timing difference (e.g., structural dip) between traces. For example, a cross-correlation technique may be implemented, a technique based on a phase shift analysis between traces, etc. As an example, a method may implement a Taylor series expansion technique and another technique for calculating time/depth-varying timing difference (e.g., structural dip) between traces.

As an example, a method can include calculating one or more similarity metrics or measures. A method may include calculating, on a sample-by-sample basis, similarity for individual dip models against a reference model. For example, consider a method that includes, for individual offsets/angles and positions (e.g., samples), calculating an RMS difference. In such an example, an equation such as the following may be implemented:

$$\text{Error} = \sqrt{[(ilr-il)^2 + (xlr-xl)^2]}$$

where, Error is an RMS difference (e.g., an "error" metric or measure), ilr is the inline reference dip, il is the local inline dip, xlr is the crossline reference dip, and xl is the local crossline dip.

The foregoing equation may be viewed as providing a norm (e.g., a Euclidean norm), noting that one or more other types of equations may be implemented as to a similarity metric or metrics. As an example, a norm of a construct may be a quantity that in some sense describes a length, a size, or an extent of the construct (e.g., local with respect to a reference, etc.). As an example, a norm may be an "L" or "l" type of norm (e.g., denoted 1, 2, etc.). As an example, a norm may be a vector norm. As an example, a norm may be a norm defined with respect to a Euclidean space (e.g., a Cartesian space or n-space).

As an example, the unit for a dip estimate may be milliseconds-per-meter (or meter-per-meter for depth-domain seismic), abbreviated to ms/m. In such an example, the unit for the RMS difference estimate also will be ms/m.

By calculating values for such a metric, a method can output an offset/angle dependent estimate of image similarity. These values may be applied in one or more manners, for example, as part of a workflow, etc.

Figure 10:
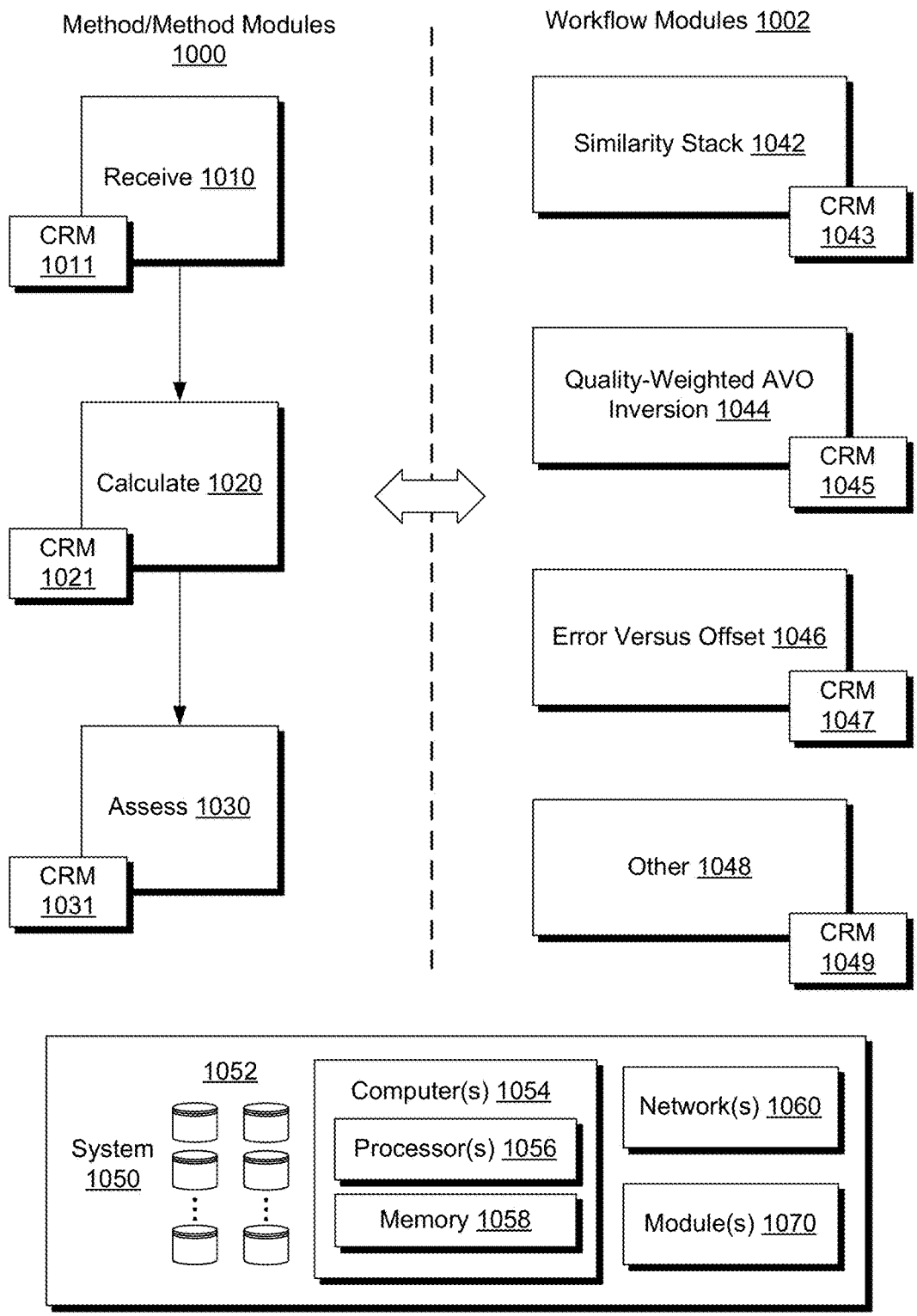
FIG. 10 illustrates an example of a method, examples of modules and an example of a system.

FIG. 10 shows an example of a method and method modules 1000, examples of workflow modules 1002 where a workflow may include one or more actions of the method 1000 and one or more of the workflow modules 1002, and an example of a system 1050. As an example, various actions may be performed in series, parallel or in series and in parallel.

As shown in FIG. 10, the system 1050 includes one or more information storage devices 1052, one or more computers 1054, one or more networks 260 and one or more modules 1070. As to the one or more computers 1054, each computer may include one or more processors (e.g., or processing cores) 1056 and memory 1058 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc., and may be stored, for example, in one or more of the storage devices 1052.

As an example, the one or more modules 1070 may include instructions (e.g., stored in memory) executable by one or more processors to instruct the system 1050 to perform various actions. As an example, the system 1050 may be configured such that the one or more modules 1070 provide for establishing the framework 170 of FIG. 1 or a portion thereof. As an example, one or more methods, techniques, etc., may be performed using one or more modules, which may be, for example, one or more of the one or more modules 270 of FIG. 2 and/or the one or more modules 1070 of FIG. 10.

As shown in FIG. 10, the method 1000 includes a reception block 1010 for receiving information, a calculation block 1020 for calculating values for one or more metrics and an assessment block 1030 for assessing information, one or more processes, etc., based at least in part on a portion of the values.

As shown in FIG. 10, the workflow modules include a similarity stack module 1042, a quality-weighted AVO inversion module 1044, an error versus offset module 1046 and another module 1048, representing that one or more other modules may be included and optionally implemented in a workflow.

FIG. 10 also shows various computer-readable media (CRM) blocks 1011, 1021, 1031, 1043, 1045, 1047 and 1049. Such blocks generally include instructions suitable for execution by one or more processors (or processor cores) to instruct a computing device or system to perform one or more actions. While various blocks are shown, a single medium may be configured with instructions to allow for, at least in part, performance of various actions described with respect to FIG. 10. As an example, a computer-readable medium (CRM) may be a computer-readable storage medium that is non-transitory and that is not a carrier wave.

As to the similarity stack module 1042, as an example, a method or workflow can include stacking up (e.g., calculating the average of) error measurements, for individual samples, across a plurality of offsets/angles, and using the resulting stack as an indicator of local image quality, and hence a measure of the suitability for inversion for that subsurface point (e.g., AVO inversion, AVA inversion, etc.). As mentioned, an inversion process can be used to create a model such as an acoustic impedance model. However, the resulting model may be sensitive to quality of data used in the inversion process. A similarity stack may be generated or received as part of a workflow that may assess data prior to an inversion process or, for example, to assess a model as to one or more regions (e.g., of a subsurface) based at least in part on information in the similarity stack.

As an example, as a similarity stack can be a metric for measuring quality of seismic imaging of the underground, a similarity stack may be used to optimize processing and/or imaging of seismic data. For example, consider a workflow that selects, adjusts, etc., processing leading up to the generation of a 3D image, where the processing may be based on discrete decisions and/or parameter-settings during one or more stages of the processing. Via a similarity stack approach, a workflow may calculate the quality and impact of these decisions and/or parameter settings where the workflow may implement a plurality of choices and settings, and select the combination with the minimal imaging error, for a cube, or for a particular zone of interest (e.g., a portion of a cube).

As to the quality-weighted AVO inversion module 1050, as an example, a method or workflow may use offset/angle dependent image quality estimates as weights during AVO/AVA inversion. An AVO/AVA inversion process may examine amplitude variability across a plurality of offsets/angles and, for example, try to fit this amplitude response to a parametric AVO/AVA response. As an example, consider a process that includes regression fitting of modeled amplitude against observed amplitudes. As a method can perform calculations that provide values that may allow discriminate between good and bad amplitude observations, such a method may include implementing one or more regression techniques that aim to honor reliable samples more than uncertain samples.

As an example, consider least-squares fitting of modeled amplitude response versus observed amplitudes where the least-squares approach aims to minimize a residual of an estimated AVO/AVA model:

$$R = \sum_{i=1}^{N} R(i)^2 = \sum_{i=1}^{N} (A_m(i) - A_o(i))^2$$

where N is a considered number of offsets/angles, $A_m(i)$ is the modeled amplitude for offset/angle i, and $A_o(i)$ is the observed/measured amplitude.

As to the quality-weighted AVO inversion module 1044, consider weighting individual residuals based on the uncertainty/error estimate for the current offset/angle:

$$R = \sum_{i=1}^{N} w(i)R(i)^2 = \sum_{i=1}^{N} w(i)(A_m(i) - A_o(i))^2$$

where w(i) is a function of the error/uncertainty for the current observed sample.

As an example, consider a weight function as follows:

$$w(i) = [a^{be(i)}]^{-1}$$

where a and b are two user-specified constants, where a may be a real number >1 and b may be a positive real number >0.

As an example, a default setting may be a=2 and b=2. In such an example, for a sample with zero error (0), the weight for that sample will be 1.0 (i.e., the sample will be fully honored), but if the error value is unity (1), the weight will be ¼=0.25 (i.e., the suspect sample will add a penalty of 25% to the least-squares optimization, versus 100% for a non-weighted AVO inversion.

However, as a quality AVO inversion can depend on sufficient (e.g., with some redundancy) quality observations across a plurality of angles (e.g., near, mid, and far), a method may implement one or more other weight functions, for example, to help ensure sufficient weight for observations at far offsets; although they may be a bit questionable, if offset/angle coverage becomes an issue for a particular dataset.

As an example, a method can include honoring AVO inversion quality measurements when calculating Absolute Acoustic Impedance (e.g., AAI), etc., based on AVO attributes. As the AAI includes an integration/summation over a plurality of AVO/AVA samples for a trace, and some of those samples may be deemed inaccurate by the offset/angle-dependent quality attribute, a risk may be that poor-quality estimates can pollute the integral. As an example, a method may reduce the influence (e.g., weight) of the poorer-quality samples during an integration process.

As to the error versus offset module 1046, one may investigate how imaging error behaves as a function of offset/angle. As an example, a method may, in a standard least-squares sense, calculate two parameters (e.g., Incidence Error and Gradient Error) in a manner used to calculate classic two-term AVO attributes (e.g., Incidence Amplitude and Gradient Amplitude). As an example, an Incidence Error attribute may be a zero-offset/zero-angle measurement of imaging quality, while a Gradient Error may be a measure of how the imaging quality varies linearly with increasing offset/angle. These measurements may provide insight into the imaging quality for one or more locations.

As an example, where Incidence Error is high (e.g., near-offset imaging quality is poor), while Gradient Error is materially negative-valued (e.g., imaging quality improves with increasing offset/angle), then a method may perform an assessment that outputs a conclusion that near-offset imaging is obstructed by shallow irregularities (e.g., faults, scatterers, near-offset "ringing" multiples, gas chimney, etc.) while far-offset imaging is good, for example, due to undershooting of the obstructions. In such an example, a method may include giving more weight to far offsets in a stacking process.

As an example, as to Incidence Error, where it is low (e.g., near-offset imaging quality is good), while Gradient Error is materially positive (e.g., imaging quality degrades with increasing offset/angle), then a method may include making an assessment that the far-offset rays are scattered randomly, while the near-offset rays are reflected reliably. Such behavior may be associated with imaging of faults/fractures, where the rays hitting near vertical faults from an angle are scattered. In such an example, the combination can hence be used as a fault/fracture indicator. Such an approach correlates well with observations stemming from trials on real data. Thus, a method may include making an assessment and determining that features such as a fault, a fracture, etc., exist.

Figure 11:
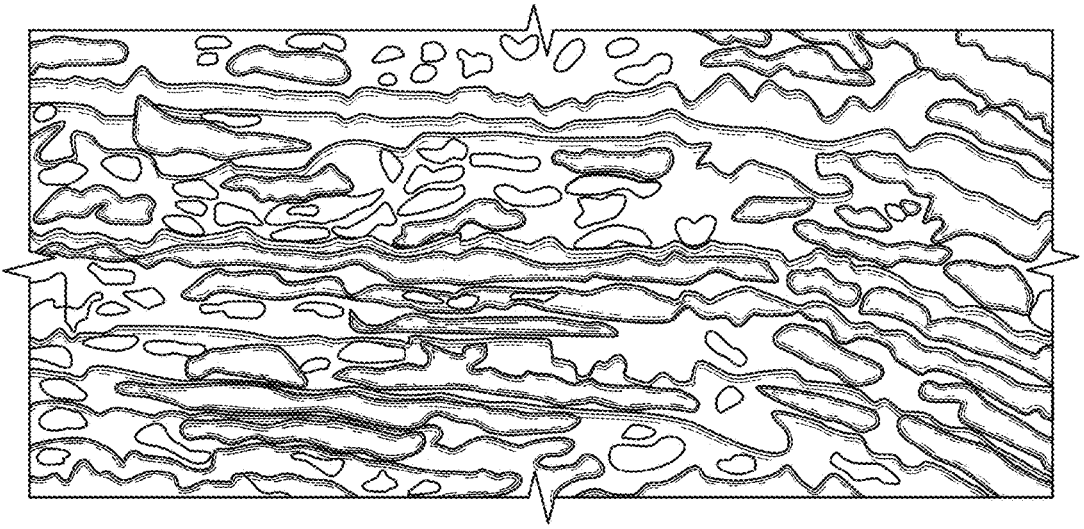
FIG. 11 illustrates examples of data for two different survey angles.
Figure 11:
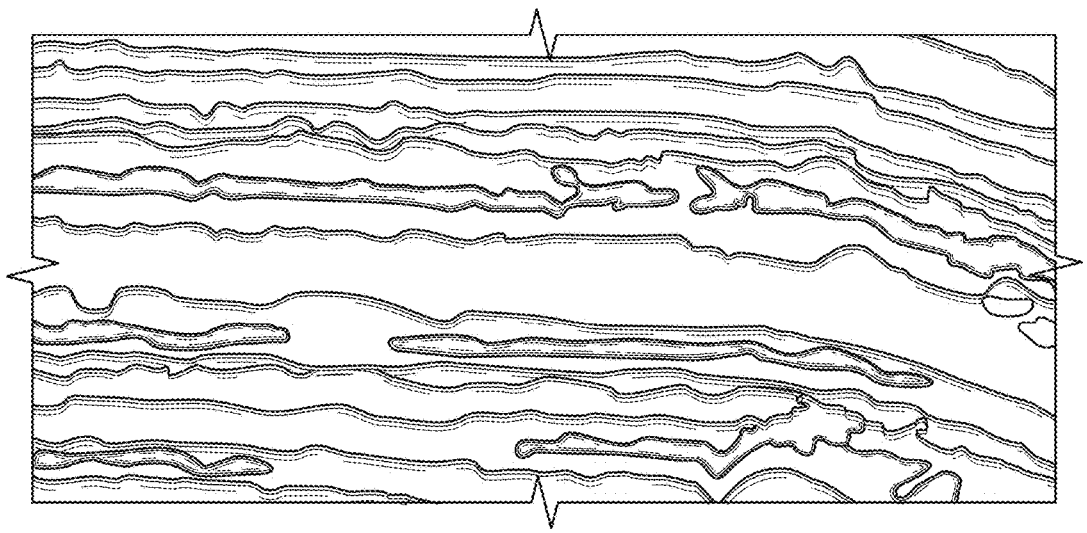

FIG. 11 shows an example of data for a first survey angle 1102 and an example of data for a second survey angle 1104 where the second survey angle is greater than the first survey angle. For example, consider the examples of FIG. 5 and the trends of FIG. 6.

Figure 12:
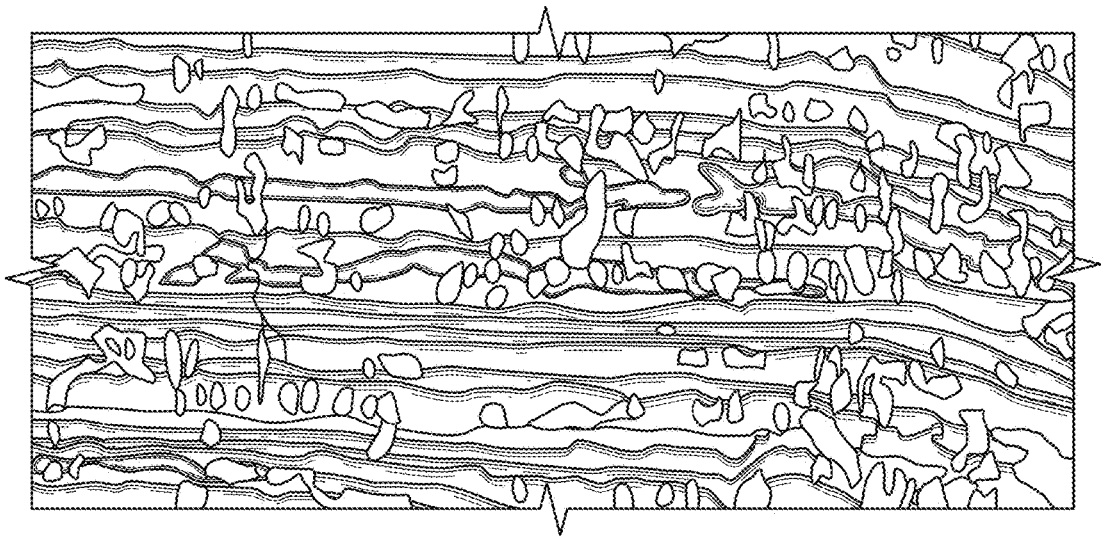
FIG. 12 illustrates an example of data that includes uncertainty values.

FIG. 12 shows an example of data 1206 that includes an uncertainty metric or attribute calculated based at least in part on the data of FIG. 11.

Figure 13:
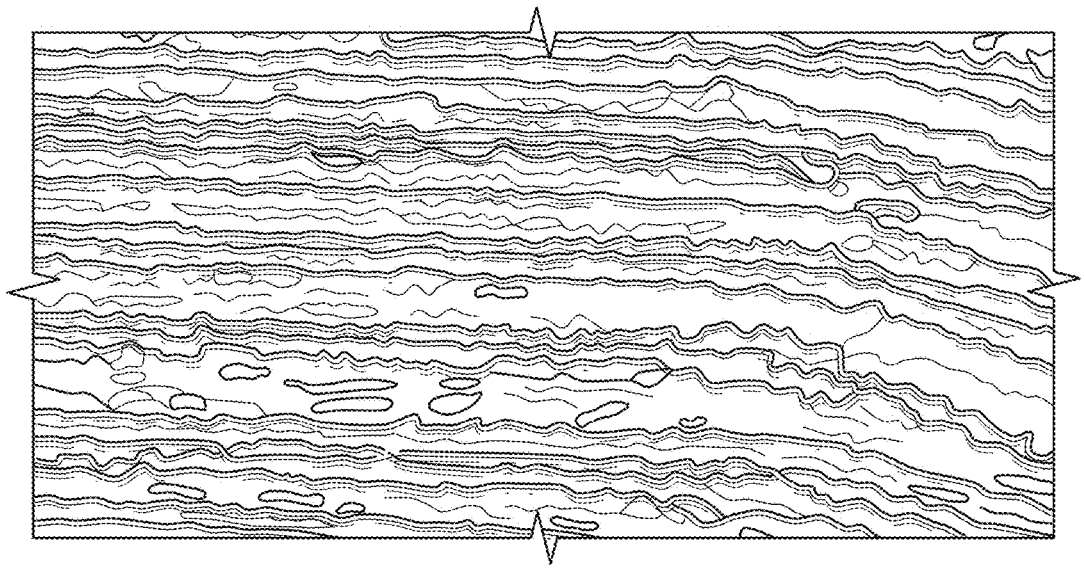
FIG. 13 illustrates an example of a stack without uncertainty values and an example of a stack with uncertainty values.
Figure 13:
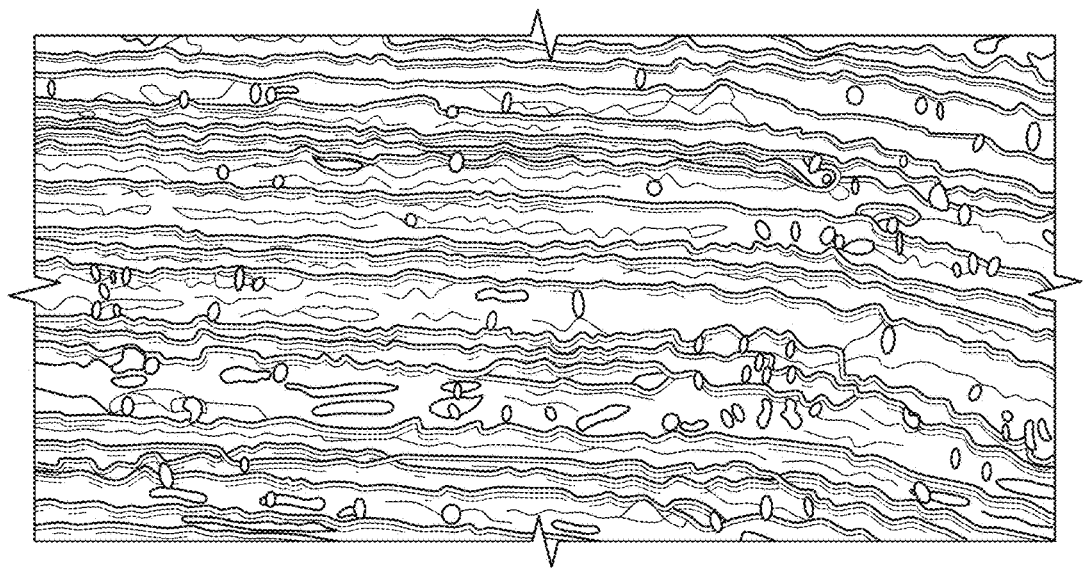

FIG. 13 shows an example of stack data 1308 and an example of the stack data 1310 including uncertainty information.

Figure 14:
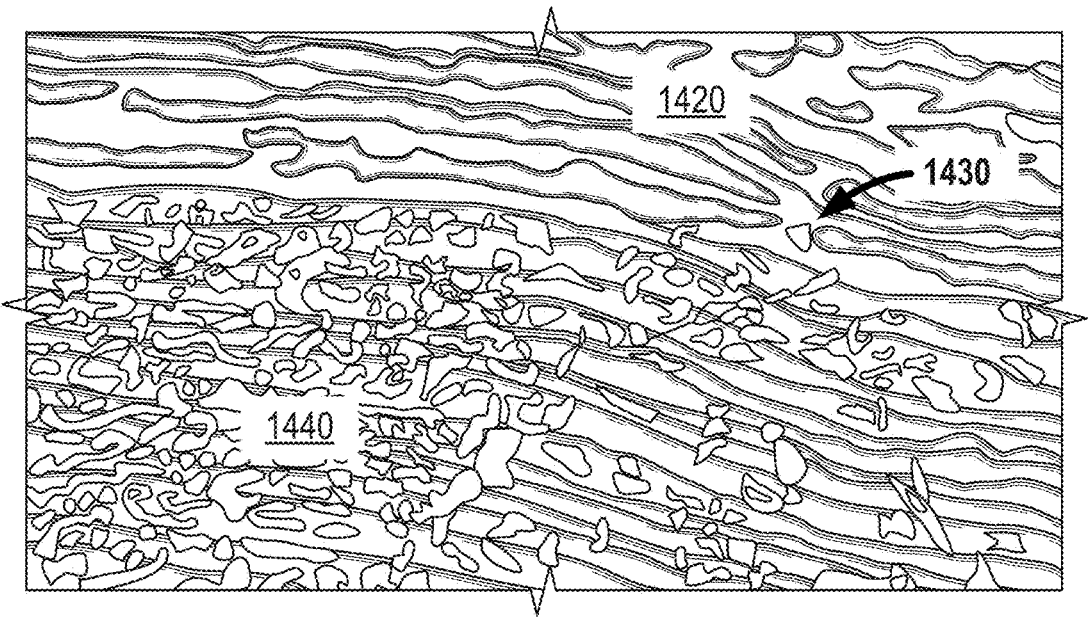
FIG. 14 illustrates an example of a visualization of data where an intersecting layer includes uncertainty values.
Figure 14:
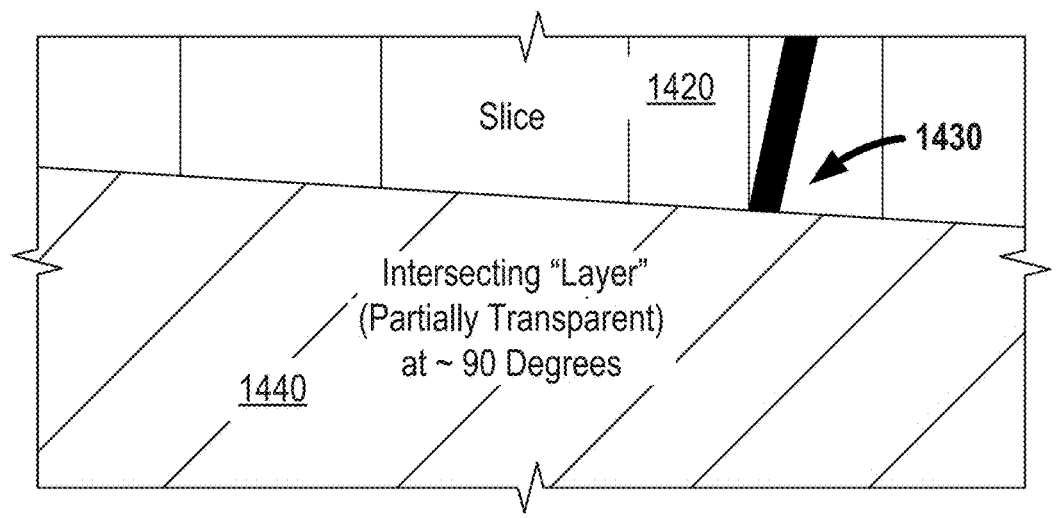

FIG. 14 shows an example of data 1410 that includes a slice 1420 and an intersecting layer 1440 where uncertainty information indicates that a feature may exist at a location 1430. For example, uncertainty information may differ for one side of the feature versus another side of the feature. In the example of FIG. 14, greater uncertainty exists to the left side of the feature (e.g., in 3D) compared to the right side of the feature with respect to the intersecting layer 1440. As an example, the data 1410 and the data 1420 may reveal one or more discontinuities in one or more reflectors (e.g., one or more layers).

As an example, a method may include assessing data and highlighting one or more regions where a discontinuity may exist in at least one layer. For example, an algorithm may include ant-tracking to characterize continuity and/or discontinuity and/or may include determining one or more local uncertainty metrics. As an example, where uncertainty changes occur such changes may be assessed via continuity and/or discontinuity of data, which may optionally be characterized via ant-tracking or another technique. As an example, ant-tracking may include using an algorithm that by analogy, involves "ants" finding the shortest path between their nest and their food source (e.g., by communicating using pheromones to attract other ants). In such an example, the shortest path becomes marked with more pheromones than longer paths such that subsequent ants are more likely to choose the shortest path, and so on. As an example, ant-tracking may be performed as part of a workflow, which may include, for example, generating ant track data, from which, for example, one or more features may be extracted. In turn, such features may be subject to one or more of validation, editing or other process. Ant-tracking may generate an ant-tracking attribute, an ant-tracking surface, an ant-tracking volume (e.g., or cube), etc.

As an example, a method may include analyzing information for one or more layers. For example, a method may include generating similarity metrics for a plurality of seismic data sets where each of the data sets corresponds to a particular emitter-detector arrangement (e.g., as in an AVO or AVA survey). In such an example, at least a portion of the similarity metrics may be analyzed to determine whether one or more types of feature exist in an imaged subsurface region. As an example, a layer-by-layer analysis may be performed where similarity metrics that correspond to the individual layers may vary. For example, where brittle rock is disposed between two layers of less brittle rock, calculated similarity metrics for the layers may differ.

As an example, after an analysis of similarity metrics for a plurality of data sets, a method or workflow may include adjusting one or more parameters associated with a survey. As an example, a midpoint may be a parameter of a survey, a number of angles may be a parameter of a survey, a number of offsets may be a parameter of a survey, an angle interval may be a parameter of a survey, an offset interval may be a parameter of a survey, etc.

As an example, a method can include receiving data sets where each of the data sets corresponds to one of a plurality of individual emitter-detector arrangements; calculating a multi-dimensional similarity metric for one of the data sets; and based at least in part on the multi-dimensional similarity metric, assessing the one data set. In such an example, for the one data set, the calculating a multi-dimensional similarity metric can include calculating individual similarity values for individual samples of the one data set.

As an example, data sets can be seismic data sets of a geologic survey. As an example, data sets can be ultrasound data sets of a survey. In such an example, the survey may be a survey of a body, for example, consider an ultrasound survey of a human body.

As an example, an ultrasound survey may acquire data sets where each of the data sets corresponds to one of a plurality of individual emitter-detector arrangements. For example, an arrangement can include an ultrasound emitter positioned at one location and an ultrasound detector positioned at another location. An ultrasound system that includes one or more emitters and one or more detectors may operate with frequencies from about 20 kHz to about several gigahertz. As an example, an ultrasound system may be used to detect one or more objects, measure one or more distances, etc. As an example, an ultrasound system may acquire data sets that can be processed to form an image or images (e.g., 2D or 3D). As an example, an ultrasound system may be a sonography system, for example, as may be used in veterinary medicine and human medicine. As an example, an ultrasound system may be implemented for nondestructive testing of a product, a structure, etc. For example, nondestructive testing may aim to detect defects in a product, a structure, etc.

As an example, where data sets include seismic data sets of a geologic survey, a multi-dimensional similarity metric can be based at least in part on structural dip. As an example, a method can include calculating structural dip for at least one seismic data set (e.g., of a plurality of seismic data sets).

As an example, a method can include assessing a multi-dimensional similarity metric as part of a data quality assessment. As an example, assessing may include classifying data with respect to at least one of a plurality of classes. For example, consider classes that may be along a spectrum of low data quality to high data quality, which may be relative to each other or otherwise specified. As an example, a data quality class may be specified via use of one or more statistical techniques.

As an example, for a survey, each of a plurality of individual emitter-detector arrangements may correspond to an angle or an offset of an amplitude versus angle (AVA) or an amplitude versus offset (AVO) survey. In such an example, the survey may be a seismic survey that acquires seismic data sets where at least one data set can exist for each of the plurality of individual emitter-detector arrangements. As an example, a method may include assessing at least one similarity metric by, at least in part, assigning an error to a data set where the error corresponds to the angle or the offset of the data set. For example, an error may be assigned to a seismic data set where the seismic data set corresponds to an angle of an amplitude versus angle (AVA) seismic survey of a geologic environment or an error may be assigned to a seismic data set where the seismic data set corresponds to an offset of an amplitude versus offset (AVO) seismic survey of a geologic environment.

As an example, a method can include weighting at least one data set based on assessing a similarity metric of a data set or a plurality of similarity metrics of a plurality of data sets. As an example, a method can include performing a quality-weighted AVO or AVA inversion using at least a portion of a weighted data set (e.g., or portions of a plurality of weighted data sets). As an example, weighting may act to reduce the influence of data assessed to a low data quality class, which may be relative to one or more other data quality classes, etc. For example, a seismic data set of a seismic survey of a geologic environment may be weighted and a quality-weighted inversion (e.g., AVO or AVA) performed.

As an example, a method can include generating a similarity stack. Such a stack may be generated, for example, by calculating averages of error measurements (e.g., or error metrics). In such an example, such calculating may calculate for individual samples, across a plurality of offsets/angles, and use this stack as an indicator of local image quality, and hence a measure of the suitability for AVO inversion for one or more subsurface points. In such an example, the one or more subsurface points may be subsurface to a surface of the Earth, to a surface of a body, to a surface of a product, to a surface of a structure, etc.

As an example, an assessment may include calculating a similarity stack as a metric that measures quality of imaging of a subsurface region. Such a similarity stack may be used, for example, to optimize processing/imaging of seismic data, ultrasound data, etc.

As an example, a method can include calculating a multi-dimensional similarity metric based at least in part on reference values. As an example, a method may include generating reference values. As an example, reference values may include estimated structural dip values.

As an example, a system can include a processor; memory operatively coupled to the processor; and one or more modules that include processor-executable instructions stored in the memory to instruct the system where the instructions include instructions to receive data sets where each of the data sets corresponds to one of a plurality of individual emitter-detector arrangements; calculate a multi-dimensional similarity metric for one of the data sets; and, based at least in part on the multi-dimensional similarity metric, assess the one data set. In such a system, for the one data set, instructions to calculate a multi-dimensional similarity metric can include instructions to calculate individual similarity values for individual samples of the one data set. In such an example, the data sets may be or include seismic data sets of a geologic survey where each of the seismic data sets corresponds to one of a plurality of individual emitter-detector arrangements.

As an example, one or more modules of a system can include processor-executable instructions stored in memory of the system that can upon execution instruct the system to weight at least one data set based on a similarity metric-based assessment; and, for example, perform a quality-weighted AVO or AVA inversion using at least a portion of a weighted data set. As an example, a system may include instructions to weight a plurality of data sets. As an example, one or more seismic data sets may be weighted.

As an example, one or more computer-readable storage media can include computer-executable instructions to instruct a computer where the instructions include instructions to receive data sets where each of the data sets corresponds to one of a plurality of individual emitter-detector arrangements; calculate a multi-dimensional similarity metric for one of the data sets; and, based at least in part on the multi-dimensional similarity metric, assess the one data set. In such an example, the instructions to assess can include instructions to classify data with respect to at least one of a plurality of classes. For example, consider a plurality of classes that include a spectrum of data quality classes that range from low data quality to high data quality. As an example, data sets may be or include seismic data sets of a geologic survey where each of the seismic data sets corresponds to one of a plurality of individual emitter-detector arrangements associated with the geologic survey.

As an example, a workflow may be associated with various computer-readable media (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more modules, for example, such as the one or more modules 270 of the system 250 of FIG. 2, or the one or more modules 1070 of the system 1050 of FIG. 10.

Figure 15:
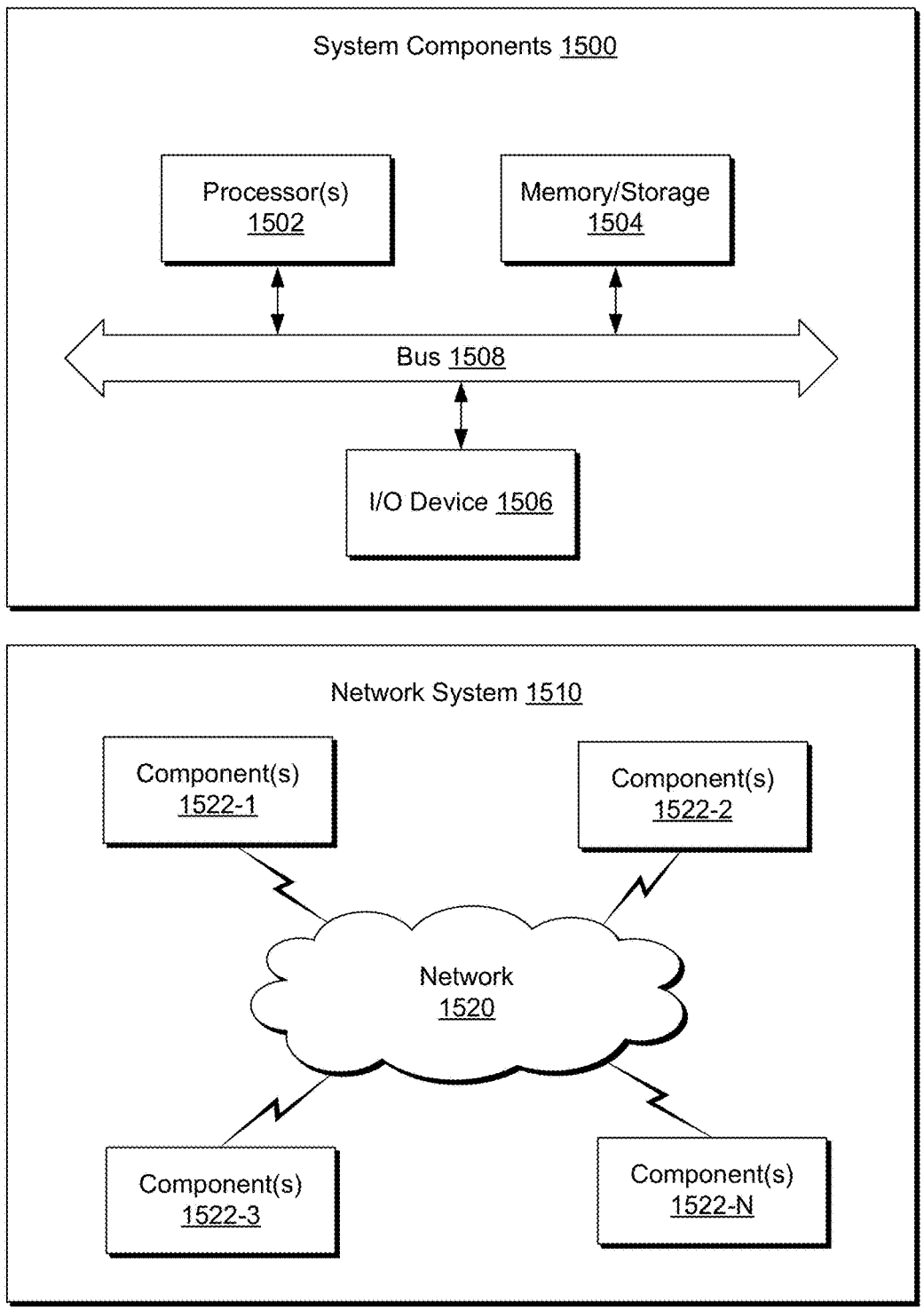
FIG. 15 illustrates example components of a system and a networked system.

FIG. 15 shows components of an example of a computing system 1500 and an example of a networked system 1510. The system 1500 includes one or more processors 1502, memory and/or storage components 1504, one or more input and/or output devices 1506 and a bus 1508. In an example embodiment, instructions may be stored in one or more computer-readable media (e.g., memory/storage components 1504). Such instructions may be read by one or more processors (e.g., the processor(s) 1502) via a communication bus (e.g., the bus 1508), which may be wired or wireless. The one or more processors may execute such instructions to implement (wholly or in part) one or more attributes (e.g., as part of a method). A user may view output from and interact with a process via an I/O device (e.g., the device 1506). In an example embodiment, a computer-readable medium may be a storage component such as a physical memory storage device, for example, a chip, a chip on a package, a memory card, etc., (e.g., a computer-readable storage medium).

In an example embodiment, components may be distributed, such as in the network system 1510. The network system 1910 includes components 1522-1, 1522-2, 1522-3, . . . 1522-N. For example, the components 1522-1 may include the processor(s) 1502 while the component(s) 1522-3 may include memory accessible by the processor(s) 1502. Further, the component(s) 1522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc., interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc., such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for enhanced image generation from seismic energy survey data, the method comprising:
via an interface of a computer, receiving seismic energy data sets of seismic energy survey data wherein each of the seismic energy data sets corresponds to one of a plurality of individual seismic energy emitter-detector arrangements wherein each of the plurality of individual seismic energy emitter-detector arrangements corresponds to an angle or an offset of a seismic energy amplitude versus angle (AVA) or a seismic energy amplitude versus offset (AVO) survey of a geologic environment that comprises structural features identifiable in an image generated via at least a portion of the seismic energy survey data wherein the seismic energy survey data comprises seismic energy attenuation data and seismic energy reflection data from interactions of emitted seismic energy with structural features of the geologic environment;
via the computer, calculating structural dip based at least in part on a portion of the seismic energy survey data;
via the computer, calculating a multi-dimensional similarity metric for one of the seismic energy data sets, wherein the multi-dimensional similarity metric is based at least in part on the structural dip;
based at least in part on the multi-dimensional similarity metric, making an assessment of the one seismic energy data set with respect to at least one of the structural features of the geologic environment to assess structure-based seismic energy imaging error as a function of angle or offset of the AVA or AVO survey; and
based at least in part on the assessment, via the computer, processing at least a portion of the seismic energy survey data to account for the structure-based seismic energy imaging error to generate the image as an enhanced image.

2. The method of claim 1 wherein, for the one seismic energy data set, the calculating a multi-dimensional similarity metric comprises calculating individual similarity values for individual samples of the one seismic energy data set.

3. The method of claim 1 wherein the assessment comprises a data quality assessment.

4. The method of claim 1 wherein the making the assessment comprises classifying data with respect to at least one of a plurality of classes.

5. The method of claim 1 wherein the making the assessment comprises assigning an error to the one seismic energy data set wherein the error corresponds to the angle or the offset of the one seismic energy data set.

6. The method of claim 1 comprising weighting at least the one of the seismic energy data sets based on the assessment.

7. The method of claim 6 comprising performing a quality-weighted AVO or AVA inversion using at least a portion of a weighted one of the seismic energy data sets.

8. The method of claim 6 wherein the weighting reduces the influence of seismic energy data assessed, per the assessment, to a low data quality class.

9. The method of claim 1 comprising generating a similarity stack.

10. The method of claim 1 wherein calculating the multi-dimensional similarity metric comprises generating reference values.

11. The method of claim 10 wherein the reference values comprise estimated structural dip values.

12. A system comprising:
a processor;
memory operatively coupled to the processor; and
processor-executable instructions stored in the memory to instruct the system, the instructions comprising instructions to
receive seismic energy data sets of seismic energy survey data wherein each of the seismic energy data sets corresponds to one of a plurality of individual seismic energy emitter-detector arrangements wherein each of the plurality of individual seismic energy emitter-detector arrangements corresponds to an angle or an offset of a seismic energy amplitude versus angle (AVA) or a seismic energy amplitude versus offset (AVO) survey of a geologic environment that comprises structural features identifiable in an image generated via at least a portion of the seismic energy survey data wherein the seismic energy survey data comprises seismic energy attenuation data and seismic energy reflection data from interactions of emitted seismic energy with structural features of the geologic environment;
calculate structural dip based at least in part on a portion of the seismic energy survey data;
calculate a multi-dimensional similarity metric for one of the seismic energy data sets, wherein the multi-dimensional similarity metric is based at least in part on the structural dip;
based at least in part on the multi-dimensional similarity metric, make an assessment of the one seismic energy data set with respect to at least one of the structural features of the geologic environment to assess structure-based seismic energy imaging error as a function of angle or offset of the AVA or AVO survey; and
based at least in part on the assessment, process at least a portion of the seismic energy survey data to account for the structure-based seismic energy imaging error to generate the image as an enhanced image.

13. The system of claim 12 wherein, for the one seismic energy data set, the instructions to calculate a multi-dimensional similarity metric comprise instructions to calculate individual similarity values for individual samples of the one seismic energy data set.

14. The system of claim 12 wherein the processor-executable instructions stored in the memory comprise instructions to instruct the system to: weight at least the one of the seismic energy data sets based on the assessment; and perform a quality-weighted AVO or AVA inversion using at least a portion of a weighted one of the seismic energy data sets.

15. One or more non-transitory computer-readable storage media comprising computer-executable instructions to instruct a computer, the instructions comprising instructions to:
receive seismic energy data sets of seismic energy survey data wherein each of the seismic energy data sets corresponds to one of a plurality of individual seismic energy emitter-detector arrangements wherein each of the plurality of individual seismic energy emitter-detector arrangements corresponds to an angle or an offset of a seismic energy amplitude versus angle (AVA) or a seismic energy amplitude versus offset (AVO) survey of a geologic environment that comprises structural features identifiable in an image generated via at least a portion of the seismic energy survey data wherein the seismic energy survey data comprises seismic energy attenuation data and seismic energy reflection data from interactions of emitted seismic energy with structural features of the geologic environment;

calculate structural dip based at least in part on a portion of the seismic energy survey data;

calculate a multi-dimensional similarity metric for one of the seismic energy data sets, wherein the multi-dimensional similarity metric is based at least in part on the structural dip;

based at least in part on the multi-dimensional similarity metric, make an assessment of the one seismic energy data set with respect to at least one of the structural features of the geologic environment to assess structure-based seismic energy imaging error as a function of angle or offset of the AVA or AVO survey; and based at least in part on the assessment, process at least a portion of the seismic energy survey data to account for the structure-based seismic energy imaging error to generate the image as an enhanced image.

16. The one or more non-transitory computer-readable storage media of claim 15 wherein the instructions to make an assessment comprise instructions to classify data with respect to at least one of a plurality of classes.

17. The one or more non-transitory computer-readable storage media of claim 16 wherein the plurality of classes comprises a spectrum of data quality classes that range from low data quality to high data quality.

18. The system of claim 12 wherein the processor-executable instructions stored in the memory comprise instructions to instruct the system to: assign an error to the one seismic energy data set wherein the error corresponds to the angle or the offset of the one seismic energy data set.

19. The method of claim 1 comprising performing seismic energy surveys of the geologic environment that generate the seismic energy data sets of seismic energy survey data.

20. The method of claim 1 comprising identifying structural features of the geologic environment in the enhanced image.

* * * * *